United States Patent [19]

Basten

[11] Patent Number: 4,966,114

[45] Date of Patent: Oct. 30, 1990

[54] INTERNAL COMBUSTION ENGINE THROTTLE CONTROL

[75] Inventor: Mark J. Basten, West Midlands, England

[73] Assignee: Lucas Industries public limited company, Birmingham, England

[21] Appl. No.: 445,183

[22] Filed: Dec. 4, 1989

[30] Foreign Application Priority Data

Dec. 16, 1988 [GB] United Kingdom ................. 8829403

[51] Int. Cl.[5] .............................................. F02D 7/00
[52] U.S. Cl. ..................................... 123/396; 180/197
[58] Field of Search ............. 123/396, 399, 400, 361, 123/336; 180/197; 251/129.03; 74/858, 6

[56] References Cited

U.S. PATENT DOCUMENTS

| | | | |
|---|---|---|---|
| 4,848,505 | 6/1989 | Yoshizawa et al. | 123/396 |
| 4,867,122 | 9/1989 | Kono et al. | 123/396 |
| 4,873,957 | 10/1989 | Veyama et al. | 123/399 |
| 4,892,071 | 1/1990 | Asayama | 123/336 |
| 4,898,039 | 2/1990 | Aiyawa et al. | 74/6 |

Primary Examiner—Raymond A. Nelli
Attorney, Agent, or Firm—Baker Maxham, Jester & Meador

[57] ABSTRACT

The extent to which a throttle can be opened is determined in accordance with a "lowest wins" philosophy. This is achieved by a transmission mechanism disposed between the accelerator pedal and the throttle valve and comprising an interlock collar fast with a rotatable shaft for operating the valve, a spring normally urging the shaft in a direction to open the valve, and first and second input collars rotatably mounted on the shaft and coupled respectively to the pedal and to a motor device operable in response to signals from electronic means in accordance with at least one appropriate parameter. The input collars are arranged to co-operate unit the interlock collar in a manner such that the angular position of the interlock collar is determined by the position of that one input collar what has moved by the smaller distance from a given retracted position.

8 Claims, 3 Drawing Sheets

INTERNAL COMBUSTION ENGINE THROTTLE CONTROL

This invention relates to a vehicle internal combustion engine throttle control.

Several undesirable effects may result if the driver of a vehicle opens the engine throttle wider than is necessary for a given existing engine load, engine speed, and road speed conditions. For example, excess throttle opening may result in wheel spin and consequent loss or reduction in traction, and/or poor fuel economy.

In our GB-B-No. 2 068 456 we have described a vehicle internal combustion engine throttle control in which the extent to which the throttle can be opened is determined in accordance with a "lowest wins" philosophy, namely that the throttle is arranged to be controlled by the accelerator pedal provided such an extent is compatible with at least one appropriate parameter, such as the existing engine load, engine speed, and road speed conditions, any deviation above that extent being corrected by operation of a motor which is responsive to signals from electronic means of which the signals determine the most appropriate throttle opening according with the said parameter.

In the construction described in GB-B-No. 2 068 456 a linkage means connecting the accelerator pedal to a butterfly valve includes a first movable member coupled to the accelerator pedal, a second movable member coupled to the butterfly valve, first spring means connecting the first movable member to the second movable member whereby depression of the accelerator pedal stresses said first spring means to tend to open the butterfly valve, mechanical limit means restricting relative motion of the ends of said first spring means so as to limit the degree to which said first spring means can be relaxed, second spring means acting to urge the butterfly valve towards a closed position, whereby lifting of the driver's foot from the accelerator pedal, thereby allowing relaxing of said first spring means to the limit permitted by said limit means, allows movement of the butterfly valve to its closed position by said second spring means, a cam, cam follower means mounted on said second movable member and urged into engagement with said cam by the action of said first spring means so as to limit opening of the butterfly valve in accordance with the position of said cam, a servo-motor drivingly connected to said cam, and said cam being shaped to provide a desired non-linear relationship between butterfly valve opening and displacement of the cam by the servo-motor, and control means for the servo-motor operating to displace the cam to a position dependent on at least one vehicle operating parameter.

According to our invention in a vehicle internal combustion engine throttle control comprising an accelerator pedal, a throttle valve means, a motor device operable in response to signals from electronic means in accordance with at least one appropriate parameter such as the existing engine load, engine speed, and road speed conditions, and a control transmission mechanism for determining what extent of a given movement of the accelerator pedal should be transmitted to the valve means, the transmission mechanism comprises an interlock member fast with a rotatable shaft for operating the valve means, resilient means normally urging the shaft in a first direction to open the valve means, and first and second input members coupled to the accelerator pedal and to the motor device respectively, each input member being movable between a retracted position and an advanced position in response to movement of the pedal and of the motor device respectively, and the input members being adapted to co-operate with the interlock member in a manner such that the operative angular position of the interlock member is determined by the position of that one input member which has moved by the smaller distance from its retracted position.

The setting of the valve means which controls the engine throttle is therefore determined in accordance with the "lowest wins" philosophy, with each input member defining a movable stop adapted selectively to determine the extent of movement of the interlock member in a throttle-opening direction in opposition to the force of the resilient means.

The input members may act on different regions of the interlock member, and are both mounted for rotation in directions corresponding to the direction of rotation of the shaft.

Conveniently both input members are journalled for rotation on the shaft.

In such a construction the input members are rotatable on portions of the shaft disposed at opposite ends of the interlock member, and force-input faces on the interlock member and respective complementary stop faces on the input members are adapted to co-operate with each other.

The interlock member may be of Tee-outline having a stem which is fast with the shaft and oppositely projecting lugs which are parallel with the axis of the shaft and which overlie the input members, the lugs being received in stepped recesses in the input members, with base faces of the recesses defining the stop faces, and the complementary faces on the lugs defining the force-input faces.

In an operative position the stop faces and the input faces are in engagement with the stop face on the input member coupled to the accelerator being held against the complementary force-input face on the interlock member by a return spring for the throttle, and the stop face on the other input member being held in a similar position by a similar return spring.

One embodiment of our invention is illustrated in the accompanying drawings in which.

Figure 1:
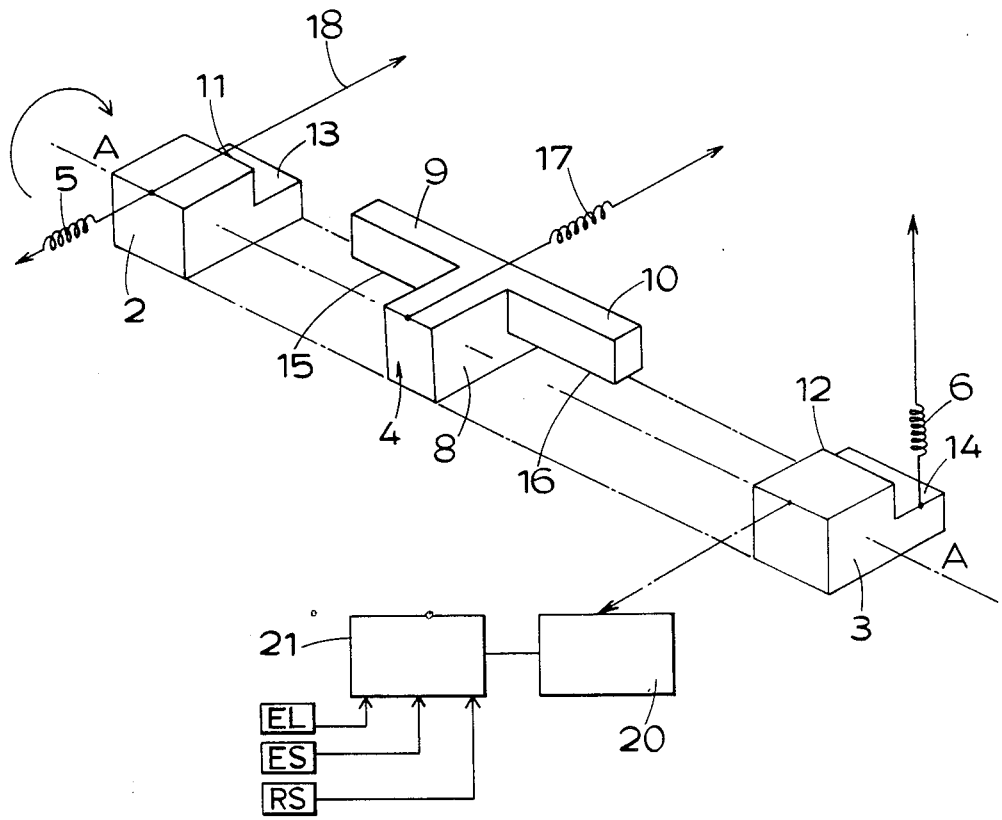
FIG. 1 is an exploded perspective view of a control transmission mechanism.

The control transmission mechanism illustrated in the drawings comprises a shaft 1 rotatable about is longitudinal axis A—A to control operation of a throttle valve means, suitably a butterfly valve (not shown), and a throttle input collar 2, and a motor driven input collar 3 which are both journalled for rotation on portions of the shaft 1 disposed at opposite ends of an interlock collar 4 which is fast with the shaft 1.

The throttle input collar 2 is located between the interlock collar 4 and the butterfly valve, and is normally urged in an anti-clockwise direction, as viewed in FIG. 1, by a throttle return spring 5. The motor input collar 3 is also normally urged in the same anti-clockwise direction by a return spring 6.

The interlock collar 4 is of generally Tee outline having a lateral stem 8 which is fast with the shaft 1 and oppositely projecting longitudinally extending lugs 9, 10 which overlie the input collars 2 and 3 and are received in respective stepped recesses 11, 12 in the two collars. The bases of the recesses 11,12 define stop faces 13, 14 respectively, and the complementary inner surfaces of the lugs 9, 10 define force-input faces 15, 16 respectively. A spring 17 urges the interlock collar 4 and the shaft 1 in a clockwise direction to open the butterfly valve.

Both input collars 2, 3 are movable angularly between retracted positions and advanced positions by independent respective operation of the accelerator pedal, which is coupled to the input collar 2 through a cable 18, and an override actuator comprising motor means 20. The actuator 20 comprises an electric motor which is driven through a gearbox and of which the operation is controlled by an electronic control module 21 which receives signals from sensors EL, ES and RS adapted to sense engine load, engine speed and vehicle road speed, respectively. The control module 21 differentiates the signals and, in accordance with the parameters received, energises the motor to determine a correct throttle position for existing conditions if that position selected by the driver is undesirable.

In an inoperative position the input collars 2 and 3 are held in their retracted positions by the springs 5 and 6 which, in turn, hold the interlock collar 4 in a similar position against the force in the spring 17 by the engagement of the stop faces 13 and 14 with the force-input faces 15, 16.

Figure 2:
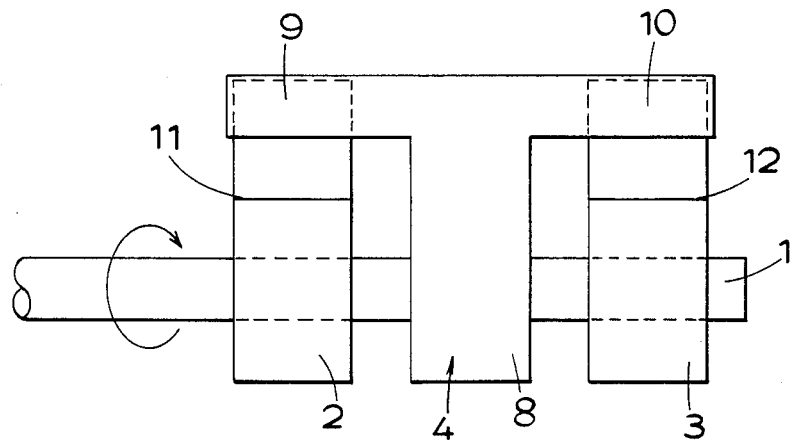
FIG. 2 is a plan view of the mechanism of FIG. 1.
Figure 3:
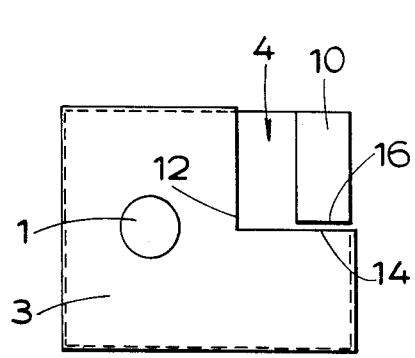
FIG. 3 is an end view of the mechanism with the throttle closed.
Figure 4:
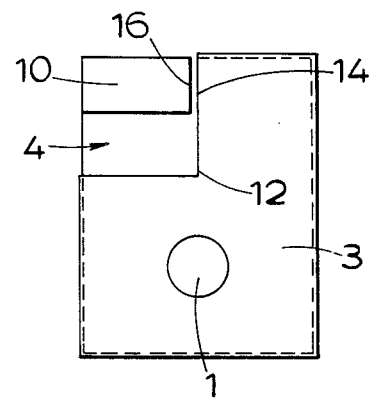
FIG. 4 is an end view with the throttle open.

When the accelerator pedal is operated by the driver, the collar 2 is moved angularly about the shaft 1 as an axis in the clockwise direction shown by the arrows in FIGS. 1 and 2. Provided this movement is compatible with signals received by the control module 21 for a given throttle opening, then this angular movement of the collar 2 is accompanied by an exact corresponding movement of the interlock collar 4, with the collar 3, in turn, also being moved angularly through the same distance against the force in the spring 6.

Figure 5:
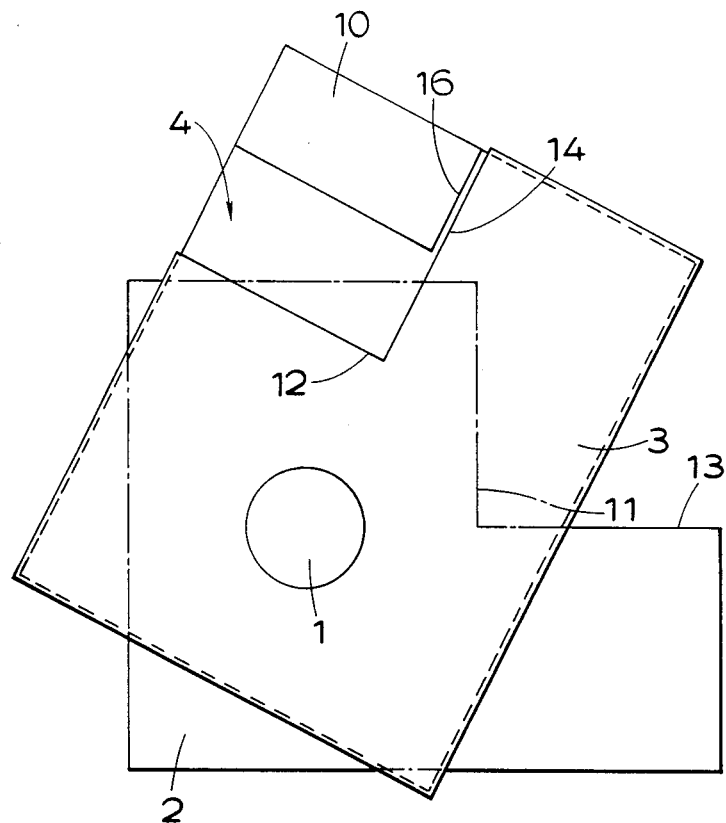
FIG. 5 shows a controlled override from an undesirable driver's demand.

Should movement of the pedal, however, be excessive, which would normally result in an excessive opening of the throttle, for example in a wheel-spin situation, then, as illustrated in FIG. 5, the collar 3 is operative to apply an automatic correction which prevents such a consequent excessive angular movement of the collar 2 being accompanied by a corresponding movement of the interlock collar 4. Specifically the collar 3 is driven by the motor in an anti-clockwise direction to counteract any tendency for the interlock collar 4 to move through an excessive distance with the collar 2. This will wind the throttle back to reduce torque. When the signal increases and the torque can be re-applied, the motor is operative to return the throttle to the driver's demand position under the control of the control module 21 and by allowing the collar 3 to rotate in the opposite clockwise direction.

In the construction described above it is not possible for the motor to open the throttle beyond that demanded by the driver. As the throttle is being opened again by the motor, excessive movement of the interlock collar 4 with the collar 3 will be arrested by the engagement of the force-input face 15 with the stop face 13 on the collar 2. Thus no movement of the collar 3 beyond this point with the motor can be transmitted to the interlock collar 4.

In addition, if at any throttle open angle the gearbox jams, the collars 2 and 4 are still able to act together under the control of the driver to close the throttle. The system is therefore 'fail-safe'.

During normal driving of the vehicle, the motor and gearbox are exercised as the throttle is opened. Such exercise will reduce any tendency for the motor and/or gearbox to seize for lack of use.

In the construction described above the electric motor can be replaced by any convenient drive mechanism responsive to signals from the control module 21, suitably an air motor, or a cable mechanism operated by a lever or similar device.

I claim:

1. A vehicle internal combustion engine throttle control comprising an accelerator pedal, a throttle valve means, a rotatable shaft for operating said valve means, a motor device operable in response to signals from electronic means in accordance with at least one appropriate parameter, and a control transmission mechanism for determining what extent of a given movement of the accelerator pedal should be transmitted to said valve means, wherein said transmission mechanism comprises an interlock member fast with said rotatable shaft, resilient means normally urging said shaft and said interlock member in a first direction through an angular distance to open said valve means, a first input member, a second input member, first coupling means coupling said first input member to said accelerator pedal, said first input member being movable between a retracted position and an advanced position in response to movement of said pedal, second coupling means coupling said second input member to said motor device, said second input member being movable between a retracted position and an advanced position, first means defining a first operative co-operation between said first input member and said interlock member with respect to said retracted position of said first input member, and second means defining a second operative co-operation between said second input member and said interlock member with respect to said retracted position of said second input member, said first means and said second means being so constructed and arranged that said angular distance through which said interlock member is movable by said resilient means is determined by the one of said first and second means defined by the operative position of the said one input member which has moved by the smaller angular distance with respect to the retracted position thereof.

2. A throttle control according to claim 1, wherein each said input member defines a movable stop adapted selectively to determine the extent of movement of said interlock member in a throttle-opening direction in opposition to said resilient means.

3. A throttle control according to claim 1, wherein said first means comprises a first stop face on said input member, and a force-input face on said interlock member adapted to co-operate with said first stop face, and said second means comprises a second stop face, a said second input member, and a second force input face on said interlock member adapted to co-operate with said second stop face, and mounting means are provided for mounting both said input members for rotation in directions corresponding to the direction of rotation of said shaft.

4. A throttle control according to claim 3, wherein said mounting means comprise means journally both said input members for rotation on said shaft.

5. A throttle control according to claim 1, wherein a first portion and a second portion of said shaft are disposed at opposite ends of said interlock member, said first input member is rotatably mounted on said first portion, said second input member is rotatably mounted on said second portion, said first input member has a first stop face, said second input member has a second stop face, and said interlock member is provided with first and second force-input faces which are complementary to said first and second stop faces respectively, and with which said first and second stop faces are adapted to co-operate.

6. A throttle control according to claim 5, wherein each said input member has a stepped recess having a base face defining the said respective stop face, and said interlock member is of Tee-outline having a stem which is fast with said shaft and oppositely projecting lugs which are parallel with the axis of said shaft and overlie said input members, said lugs being received in said stepped recesses in said input members, with faces on said lugs defining said force-input faces.

7. A throttle control according to claim 5, wherein said stop faces and said input faces are in engagement in an operative position, and a return spring for said throttle is adapted to hold said stop face input member coupled to said accelerator against said complementary force-input face on said interlock member, and a secondary return spring is adapted to hold said stop face on the said other input member against said complementary force-input face.

8. A throttle control according to claim 6, wherein said stop faces and said input faces are in engagement in an operative position, and a return spring for said throttle is adapted to hold said stop face input member coupled to said accelerator against said complementary force-input face on said interlock member, and a secondary return spring is adapted to hold said stop face on the said other input member against said complementary force-input face.

* * * * *